US012405692B2

(12) United States Patent
Ito et al.

(10) Patent No.: US 12,405,692 B2
(45) Date of Patent: Sep. 2, 2025

(54) DISPLAY-TO-TOUCH NOISE COMPENSATION SYSTEM UTILIZING DISPLAY DATA

(71) Applicant: Synaptics Incorporated, San Jose, CA (US)

(72) Inventors: Daisuke Ito, Tokyo (JP); Takashi Nose, Kanagawa (JP)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 18/511,303

(22) Filed: Nov. 16, 2023

(65) Prior Publication Data

US 2025/0165096 A1 May 22, 2025

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2017/0255294 A1 | 9/2017 | Shepelev | |
| 2020/0004378 A1* | 1/2020 | Liang | G06F 3/0412 |
| 2021/0397327 A1 | 12/2021 | Lee | |
| 2022/0019311 A1* | 1/2022 | Seyed Mousavi | G06F 18/251 |
| 2022/0244812 A1* | 8/2022 | Park | G06F 3/04164 |
| 2023/0086110 A1* | 3/2023 | Winokur | G06F 3/0412 345/173 |
| 2023/0333691 A1* | 10/2023 | Kang | G06F 3/0446 |
| 2024/0361865 A1* | 10/2024 | Harris | G06F 3/0418 |

FOREIGN PATENT DOCUMENTS

| | | | |
|---|---|---|---|
| CN | 108073329 A | 5/2018 | |
| KR | 101862398 B1 | 7/2018 | |
| KR | 102394849 B1 | 5/2022 | |

OTHER PUBLICATIONS

International Search Report, dated Mar. 10, 2025, in International Patent Application No. PCT/US2024/055936, filed Nov. 14, 2024.

* cited by examiner

*Primary Examiner* — Benjamin C Lee
*Assistant Examiner* — Emily J Frank
(74) *Attorney, Agent, or Firm* — Leydig, Voit & Mayer, Ltd.

(57) ABSTRACT

A system for noise compensation include: an input device comprising a plurality of sensor electrodes configured to obtain touch data; a display device configured to provide display data for display on a display; and a processing system configured to: obtain the display data, the display data comprising first display data for updating a plurality of subpixels of the display during a first display update period; determine, based on the first display data, estimated noise compensation data for the plurality of subpixels for the first display update period; and apply the estimated noise compensation data to touch data obtained during the first display period to mitigate an effect of display-to-touch noise on the touch data obtained during the first display update.

17 Claims, 8 Drawing Sheets

DISPLAY-TO-TOUCH NOISE COMPENSATION SYSTEM UTILIZING DISPLAY DATA

FIELD

The disclosed embodiments relate generally to electronic devices, and more particularly, to reducing interference in input devices.

BACKGROUND

Input devices, including proximity sensor devices, may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also be used in smaller computing systems, such as touch screens integrated in cellular phones. Additionally, proximity sensor devices may be implemented as part of a multimedia information system of an automobile.

As technology advances, the trend toward thinner and sleeker touch display devices brings a new challenge: interference noise between the display and input devices. This interference can impact user experience and device functionality.

SUMMARY

In an exemplary embodiment, the present disclosure provides a system for noise compensation. The system includes: an input device comprising a plurality of sensor electrodes configured to obtain touch data; a display device configured to provide display data for display on a display; and a processing system configured to: obtain the display data, the display data comprising first display data for updating a plurality of subpixels of the display during a first display update period; determine, based on the first display data, estimated noise compensation data for the plurality of subpixels for the first display update period; and apply the estimated noise compensation data to touch data obtained during the first display period to mitigate an effect of display-to-touch noise on the touch data obtained during the first display update.

In a further embodiment, determining the estimated noise compensation data for the plurality of subpixels for the first display update period comprises: determining a first output for a respective subpixel of the plurality of subpixels corresponding to a time period before the first update period; determining a second output for the respective subpixel of the plurality of subpixels corresponding to the first display update period; calculating an output change based on the first output and the second output for the respective subpixel; and determining the estimated noise compensation data based on a combination of output changes for the plurality of subpixels.

In a further embodiment, the combination of output changes for the plurality of subpixels comprises a sum of respective output changes for respective subpixels of the plurality of subpixels.

In a further embodiment, the display data further comprises second display data for updating a second plurality of subpixels during a second display update period; and the processing system is further configured to: determine, based on the second display data, second estimated noise compensation data for the second plurality of subpixels for the second display update period; and apply the second estimated noise compensation data to touch data obtained during the second display period to mitigate an effect of display-to-touch noise on the touch data obtained during the second display update.

In a further embodiment, the display device comprises a display driver.

In a further embodiment, the display device driver is part of the processing system.

In a further embodiment, the processing system is communicatively coupled to the display driver and is configured to obtain the display data from the display driver.

In a further embodiment, the display device driver and a touch controller of the input device are implemented in a same chip.

In a further embodiment, the chip implementing the display device driver and the input device touch controller is part of the processing system.

In another exemplary embodiment, the present disclosure provides a method for noise compensation, comprising: obtaining, by a processing system, display data comprising first display data for updating a plurality of subpixels of a display during a first display update period; determining, by the processing system, based on the first display data, estimated noise compensation data for the plurality of subpixels for the first display update period; and applying, by the processing system, the estimated noise compensation data to touch data obtained during the first display period to mitigate an effect of display-to-touch noise on the touch data obtained during the first display update.

In yet another example embodiment, the present disclosure provides a non-transitory computer-readable medium, having computer-executable instructions stored thereon for noise compensation. The computer-executable instructions, when executed, facilitate performance of the following: obtaining display data comprising first display data for updating a plurality of subpixels of a display during a first display update period; determining, based on the first display data, estimated noise compensation data for the plurality of subpixels for the first display update period; and applying the estimated noise compensation data to touch data obtained during the first display period to mitigate an effect of display-to-touch noise on the touch data obtained during the first display update.

It is contemplated that elements disclosed in one embodiment may be beneficially utilized on other embodiments without specific recitation. The drawings referred to here should not be understood as being drawn to scale unless specifically noted. Also, the drawings may be simplified, with details or components omitted for clarity of presentation and explanation. The drawings and discussion serve to provide examples to explain principles discussed below, where like designations denote like elements, and the drawings should not be interpreted as being limiting based on a specific exemplary depiction.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding field, background, brief description of the drawings, the following detailed description, or the appended abstract.

The terms "coupled with," along with its derivatives, and "connected to" along with its derivatives, may be used herein, including in the claims. "Coupled" or "connected" may mean one or more of the following: "coupled" or "connected" may mean that two or more elements are in direct physical or electrical contact; "coupled" or "connected" may also mean that two or more elements indirectly connect to each other, e.g., not in physical contact, but yet still cooperate or interact with each other, and may mean that one or more other elements are coupled or connected between the elements that are said to be coupled with or connected to each other.

Example embodiments of the present disclosure minimize interference noise with respect to display and input devices, and thereby improve overall user experience with respect to electronic devices utilizing principles of the present disclosure. The example embodiments include systems and methods designed to minimize interference caused by noise between a display device and an input device that operate simultaneously. The systems and methods utilize display data associated with a scheduled display update during a predefined update period to predict noise that will occur during the time period of the scheduled display update due to the scheduled display update. Based on the display data, the systems and methods determine estimated noise compensation data that is applied during the predefined update period to mitigate the effect of display noise on the touch operation. For example, the input device can utilize the estimated noise compensation data to subtract the expected noise from the touch data obtained during the display update period, improving input sensing performance of the input device.

Figure 1:
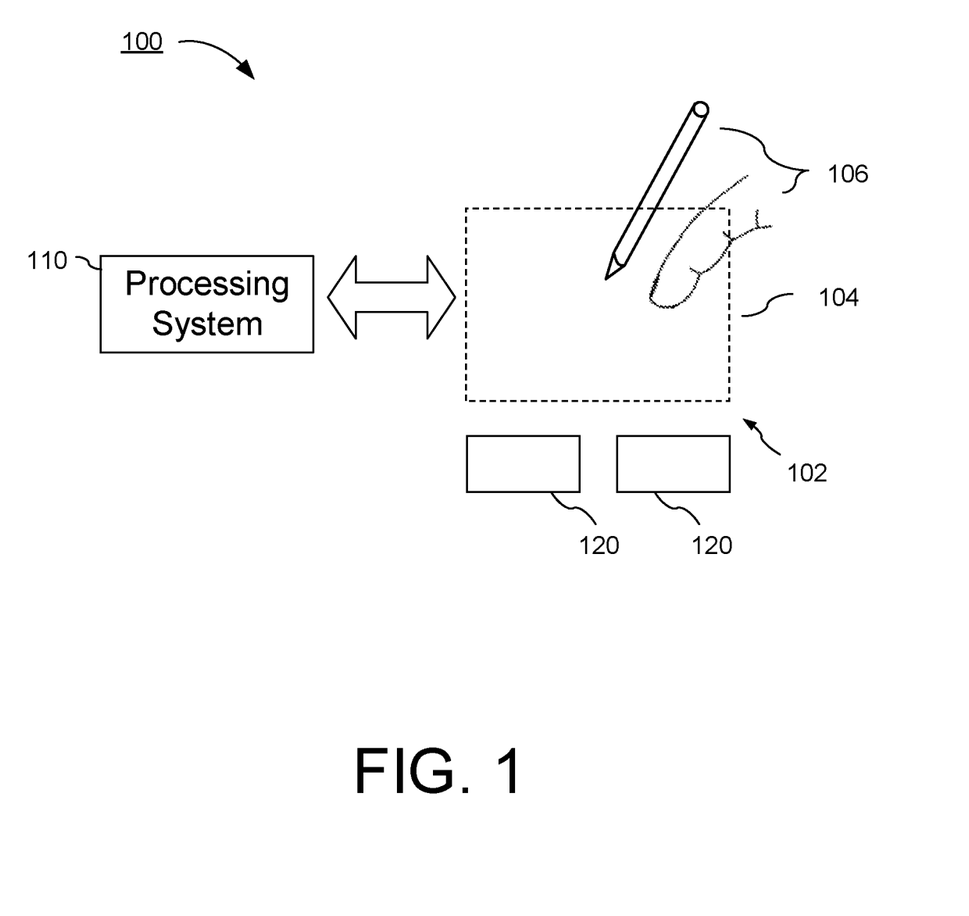
FIG. 1 is a block diagram of an example of an input device, in accordance with certain embodiments.

FIG. 1 is a block diagram of an exemplary input device 100. The input device 100 may be configured to provide input to an electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets-including foldable tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones-including foldable and rollable smart phones), media devices (including recorders, editors, and players such as televisions, set-top boxes, music players, digital photo frames, and digital cameras), automotive multimedia information systems, and internet of things (IoT) devices, among others. Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2. Universal Serial Bus (USB), Bluetooth, RF, and IRDA.

In FIG. 1, a touch sensor 102 is included with the input device 100. The touch sensor 102 comprises one or more sensing elements configured to sense input provided by one or more input objects 106 in a sensing region 104. Examples of input objects include fingers, styli, and hands. Sensing region 104 encompasses any space above, around, in and/or near the touch sensor 102 in which the input device 100 is able to detect user input (e.g., user input provided by one or more input objects). The sizes, shapes, and locations of particular sensing regions may vary from embodiment to embodiment. In some embodiments, the sensing region 104 extends from a surface of the input device 100 in one or more directions into space until signal-to-noise ratios prevent sufficiently accurate object detection. The distance to which this sensing region 104 extends in a particular direction, in some embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 in combination with some amount of applied force or pressure, and/or a combination thereof. In some embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region 104. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques. The input device 100, for example, includes a touch sensor 102 that uses capacitive techniques where a voltage or current, referred to as a sensing signal, is applied to create an electric field. Nearby input objects cause changes in the electric field, and produce detectable changes in capacitive coupling that may be detected as changes in voltage, current, or the like referred to as a resulting signal. The sensor 102 includes, for example, sensor electrodes 105 (FIG. 2A), which are utilized as capacitive sensing elements.

One exemplary technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit one or more transmitter signals. Receiver sensor electrodes may be held substantially constant relative to the reference voltage to facilitate receipt of one or more resulting signals. The reference voltage may be a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference or other electromagnetic signals. When one or more input objects are present in a sensing region of the sensor, a resulting signal may also comprise effect(s) corresponding to the one or more input objects.

The input device 100 includes a processing system 110. The processing system 110 comprises parts of or all of one or more integrated circuits (ICs) and/or other circuitry components. The processing system 110 is coupled to (or configured to couple to) the touch sensor 102, and is configured to detect input in the sensing region 104 using sensing hardware of the touch sensor 102. In some embodiments, the processing system 110 includes electronically-readable instructions, such as firmware code, software code, and/or the like. The processing system 110 can be implemented as a physical part of the sensor 102, or can be physically separate from the sensor 102. Constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs with associated firmware separate from the central processing unit (CPU). As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in the sensing region 104. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The touch sensor 102 is configured to detect position information of an input object 106 within the sensing region 104. The sensing region 104 may include an input surface having a larger area than the input object. The touch sensor 102 may include an array of sensing elements, such as capacitive sensing elements, with a resolution configured to detect a location of a touch to the input surface. In some embodiments, a pitch of the touch sensing elements or a spacing between an adjacent pair of the touch sensing elements is between 2 and 6 mm, although it will be appreciated that other geometries may be suitable.

In some embodiments, the input device 100 is implemented with additional input components that are operated by the processing system 110 or by some other processing system. These additional input components may provide redundant functionality for input in the sensing region 104, or some other functionality. FIG. 1 shows buttons 120 near the sensing region 104 that can be used to facilitate selection of items using the input device 100. Other types of additional input components include sliders, balls, wheels, switches, and the like. Conversely, in some embodiments, the input device 100 may be implemented with no other input components.

Figure 2A:
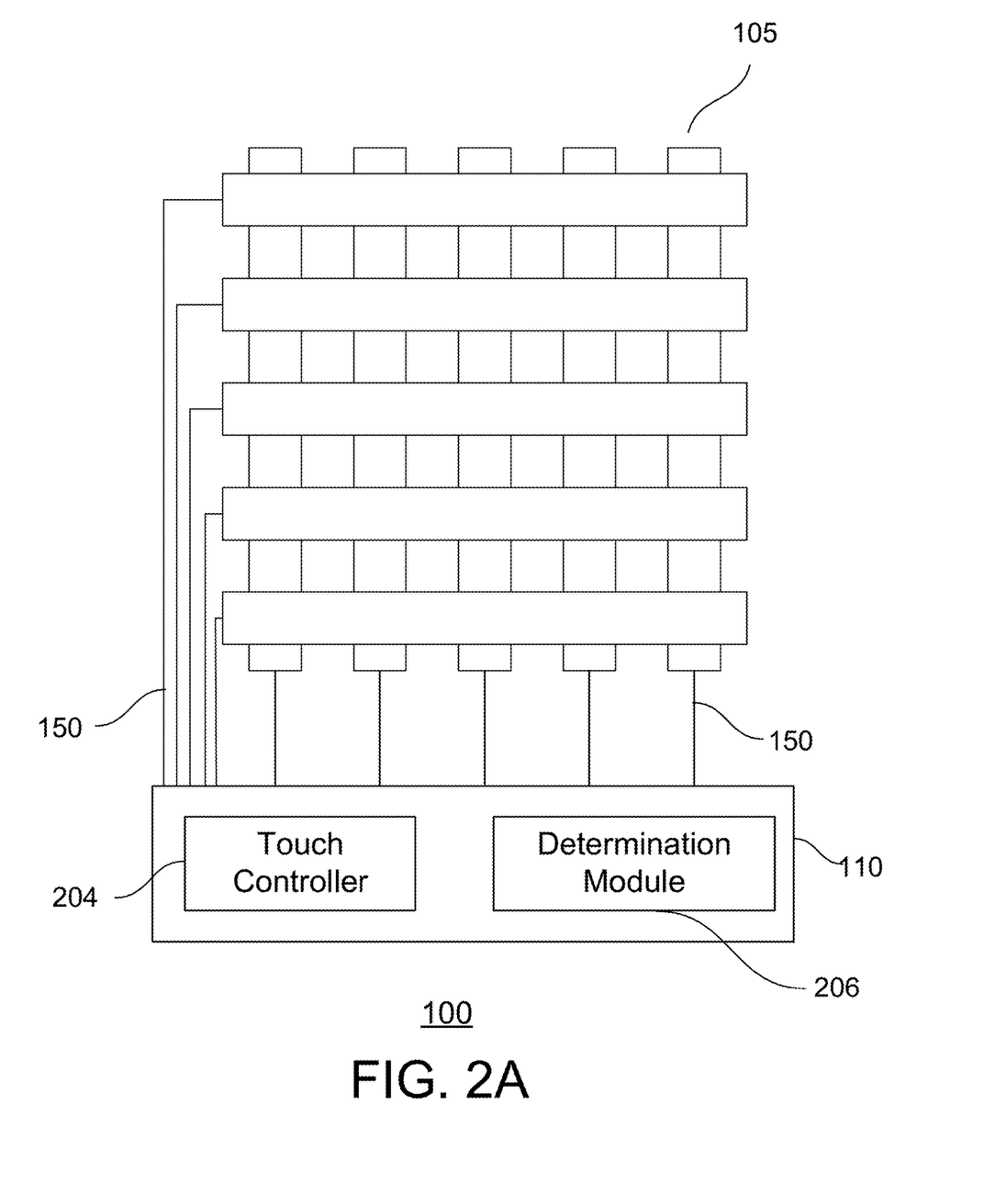
FIG. 2A is a block diagram of an example of capacitive sensing electrodes and control circuit in accordance with certain embodiments.

Referring to FIG. 2A, the input device 100 includes, in certain embodiments, sensor electrodes 105 to facilitate capacitive touch sensing. The sensor electrodes 105 are coupled to the processing system 110 via traces 150. The exemplary pattern of the sensor electrodes 105 illustrated in FIG. 2A comprises an array of sensor electrodes 105 disposed in a plurality of rows and columns. It is contemplated that the sensor electrodes 105 may be arranged in other patterns, such as polar arrays, repeating patterns, non-repeating patterns, non-uniform arrays, or other suitable arrangement. The sensor electrodes 105 may have a shape that is circular, rectangular, diamond, star, square, nonconvex, convex, nonconcave, concave, or other suitable geometry.

The sensor electrodes 105 may be disposed in one or more layers. For example, a portion of the sensor electrodes 105 may be disposed on a first layer and another portion of the sensor electrodes may be disposed on a second layer. The first and second layers may be different sides of a common substrate, or different substrates. Alternatively, the sensor electrodes 105 may be disposed in a common layer.

The sensor electrodes 105 may be comprised of a conductive material such as a metal mesh, indium tin oxide (ITO), or the like. Further, the sensor electrodes 105 are ohmically isolated from each other. That is, one or more insulators separate the sensor electrodes and prevent them from electrically shorting to each other.

The processing system 110 includes a touch controller 204. Further, as will be described in more detail below, the processing system 110 may include a determination module 206. The processing system 110 operates the sensor electrodes 105 to detect one or more input objects (e.g., the input objects 106 as shown in FIG. 1) in the sensing region 104 of the input device 100. The processing system 110 fully or partially resides in one or more integrated circuit (IC) chips. For example, the processing system 110 may reside in a single IC chip. Alternatively, the processing system 110 may include multiple IC chips. The touch controller 204 is coupled to the sensor electrodes 105 via the routing traces 150 and is configured to drive the sensor electrodes 105 with sensing signals to detect one or more input objects 106 in the sensing region 104 of the input device 100.

The touch controller 204 includes digital and/or analog circuitry. For example, the touch controller 204 comprises transmitter (or driver) circuitry to drive sensing signals onto the sensor electrodes 105 and receiver circuitry to receive resulting signals from the sensor electrodes 105. The transmitter circuitry may include one or more amplifiers and/or one or more modulators to drive sensing signals on to the sensor electrodes 105. The receiver circuitry may include integrators, filters, sample and hold circuitry, and analog-to-digital converters (ADCs), among others, to receive resulting signals from the sensor electrodes 105.

In one embodiment, the touch controller 204 drives a first one or more of the sensor electrodes 105 with a transcapacitive sensing signal, and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 106 as shown in FIG. 1) approaches the sensor electrodes 105. Driving the sensor electrodes 105 with transcapacitive sensing signals comprises modulating the sensor electrodes 105 relative to a reference voltage, e.g., system ground.

The transcapacitive sensing signal is a periodic or aperiodic signal that varies between two or more voltages. In some embodiments, the transcapacitive sensing signal has a frequency between 100 kHz and 1 MHz. In other embodiments, other frequencies may be utilized. In one embodiment, the transcapacitive sensing signal has a peak-to-peak amplitude in a range of about 1 V to about 10 V. However, in other embodiments, the transcapacitive sensing signal has other peak-to-peak amplitudes. Additionally, the transcapacitive sensing signal may have a square waveform, a sinusoidal waveform, a triangular waveform, a trapezoidal waveform (e.g., a quadrature trapezoidal waveform or the like), or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In one embodiment, the touch controller 204 operates the sensor electrodes 105 for absolute capacitive sensing by driving a first one or more of the sensor electrodes 105 with an absolute capacitive sensing signal and receiving a resulting signal with the driven sensor electrode or electrodes. Operating the sensor electrodes 105 for absolute capacitive sensing detects changes in capacitive coupling between sensor electrodes driven with an absolute capacitive sensing signal and an input object (e.g., the input object 106). The capacitive coupling of the sensor electrodes 105 driven with the absolute capacitive sensing signal is altered in response to an input object (e.g., the input object 106) interacting with the sensor electrodes.

The absolute capacitive sensing signal is a periodic or aperiodic signal that varies between two or more voltages. Further, in some embodiments, the absolute capacitive sensing signal has a frequency between 100 kHz and 1 MHz. In other embodiments, other frequencies may be utilized. Additionally, the absolute capacitive sensing signal has a square waveform, a sinusoidal waveform, a triangular waveform, a trapezoidal waveform (e.g., a quadrature trapezoidal waveform or the like), or a sawtooth waveform, among others. In one embodiment, the absolute capacitive sensing signal has a peak-to-peak amplitude in a range of about 1 V to about 10 V. However, in other embodiments, the absolute capacitive sensing signal has other peak-to-peak amplitudes.

Driving the sensor electrodes 105 with an absolute capacitive sensing signal comprises modulating the sensor electrodes 105. A resulting signal received while performing absolute capacitive sensing comprises effect(s) corresponding to one or more absolute capacitive sensing signals, and/or one or more sources of environmental interference, e.g., other electromagnetic signals. As will be described in greater detail below, a source of environmental interference may be display update signals driven by display electrodes of a display device. The absolute capacitive sensing signal may be the same or different from the transcapacitive sensing signal.

The processing system 110 further includes a determination module 206 that receives processed resulting signals from the touch controller 204 and further processes the processed resulting signals to determine changes in capacitive coupling of the sensor electrodes 105. The changes in capacitive coupling are changes in absolute capacitive coupling of the sensor electrodes 105 and/or changes in transcapacitive coupling between the sensor electrodes 105. The determination module 206 utilizes the changes in capacitive coupling of the sensor electrodes 105 to determine positional information of one or more input objects (e.g., the input object 106) relative to the sensor electrodes 105.

The measurements of the changes in capacitive coupling are utilized by the determination module 206 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images are used to derive information about an input object 106 in the sensing region 104 of the input device 100. For example, successive capacitive images acquired over successive periods of time can be used to track the motion(s) of one or more input objects entering, exiting, and within the sensing region 104 of the input device 100.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2B:
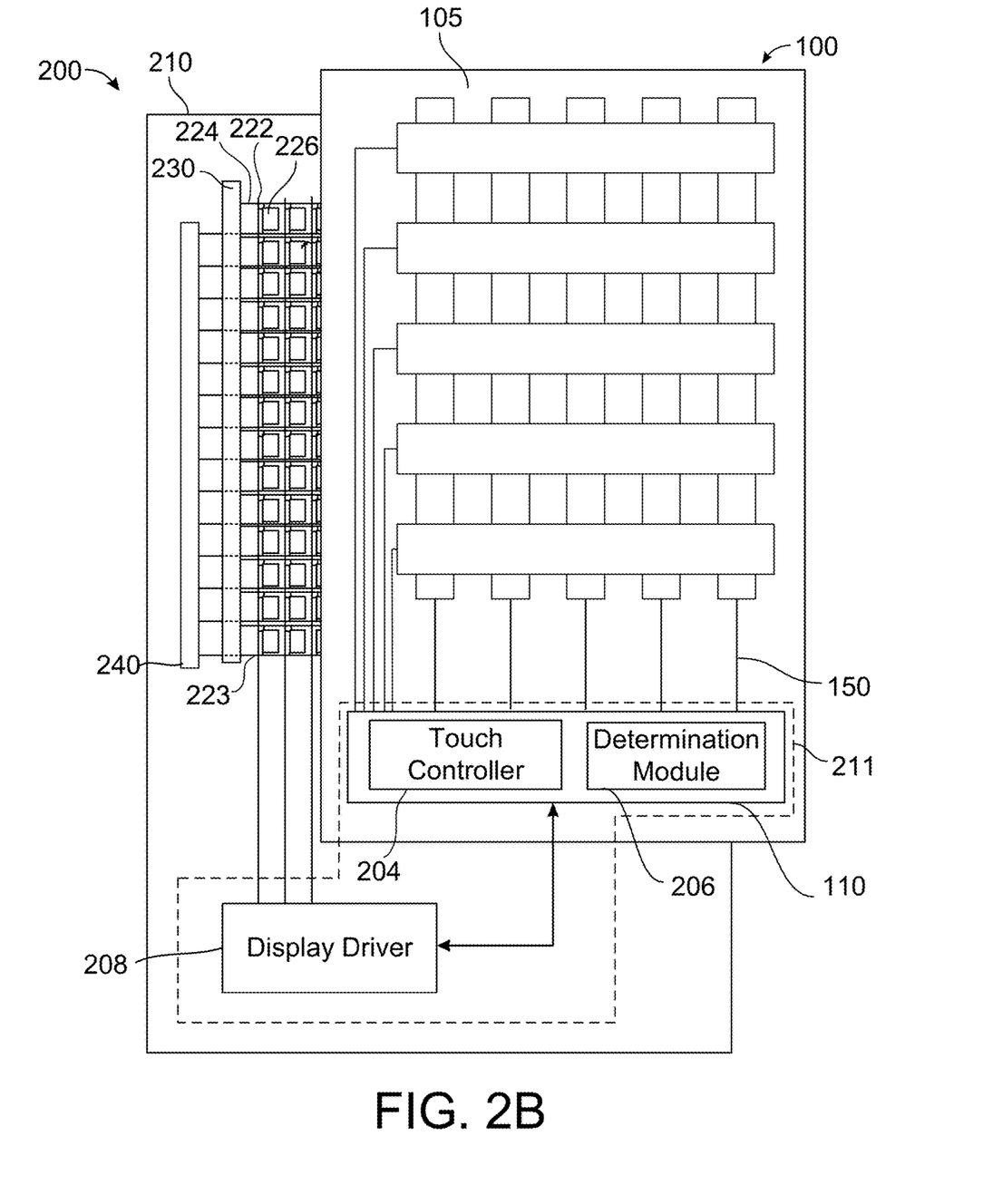
FIG. 2B is a block diagram of an example of a display device and input device in accordance with certain embodiments.

The input device 100 may be a touch screen interface that overlaps at least part of a display panel of a display device. For example as illustrated in FIG. 2B, the input device 100 is shown overlapped with a display panel 210 of a display device 200. The display panel 210 is communicatively coupled with a display driver 208 and gate selection circuitry 230. The display panel 210 includes display electrodes that are driven to update the display panel 210. The display electrodes include data lines 222, gate lines 224, emission control lines 223, subpixel electrodes 226, and/or a cathode electrode (e.g., cathode electrode 340 of FIG. 3A), among others.

The data lines 222 are coupled to the display driver 208 and the gate lines 224 are coupled to the gate selection circuitry 230. Further, the emission control lines 223 are coupled to the emission control circuitry 240. The emission control circuitry 240 is illustrated on the same side of the display panel 210 as the gate selection circuitry 230. However, in other embodiments, the emission control circuitry 240 is disposed on a side of the display panel 210 opposite on which the gate selection circuitry 230 is disposed. Further, as illustrated, the emission control lines 223 are coupled to the emission control circuitry 240 and not the gate selection circuitry 230. For example, the emission control lines 223 pass under, over and/or around the gate selection circuitry 230, and they are connected to the emission control circuitry 240. Each of the subpixel electrodes 226 is coupled to one of the gate lines 224 and one of the data lines 222. Each of the subpixel electrodes 226 is coupled to an emission control line 223. However, in one or more embodiments, the emission control lines 223 may be omitted.

The gate selection circuitry 230 is configured to drive gate select and gate deselect signals onto the gate lines 224 to select (activate) and deselect (deactivate) corresponding subpixels for updating. Further, the emission control lines 223 are driven by emission control circuitry 240 to control the brightness of the subpixel electrodes 226.

The display driver 208 includes display driver circuitry configured to drive the data lines 222 with subpixel data signals to update the selected subpixels electrodes 226 and update the display panel 210 of the display device 200. For example, the display driver 208 may drive subpixel data signals onto the data lines 222 to update selected (activated) subpixel electrodes 226 during corresponding display updating periods. The subpixel data signals may be voltage signals.

The display driver 208 is configured to update the subpixel electrodes 226 to update an image displayed on the display panel 210 during display frames. The display frames may be updated, or refreshed, once about every 16 ms, generating a display refresh rate of about 60 Hz. Alternatively, other display refresh rates may be employed. For example, the display refresh rate may be 90 Hz, 120 Hz, 140 Hz, 240 Hz or greater.

The display driver 208, the touch controller 204, and the determination module 206 may be part of a common processing system (e.g., a processing system 211 that incorporates the processing system 110). Alternatively, the display driver 208 may be part of a first processing system and the touch controller 204 and the determination module 206 may be part of a second processing system (i.e., the processing system 110). Further, the display driver 208, the touch controller 204, and the determination module 206 may be part of a common IC chip. Alternatively, one or more of the display driver 208, the touch controller 204, and the determination module 206 are disposed within a first IC chip and a second one or more of the display driver 208, the touch controller 204, and the determination module 206 are disposed on a second IC chip.

The touch controller 204 is configured to drive the sensor electrodes 105 for capacitive sensing during a capacitive frame at a capacitive frame rate. During each capacitive frame, sensor electrodes 105 are operated for capacitive sensing. Further, each capacitive frame may include multiple periods during which different sensor electrodes 105 are operated for capacitive sensing.

The "capacitive frame rate" (the rate at which successive capacitive images are acquired) may be the same or different from that of the "display frame rate" (the rate at which the display panel 210 is updated). In some embodiments, the capacitive frame rate is an integer multiple of the display frame rate. Alternatively, in other embodiments, the capacitive frame rate is a fractional multiple of the display frame rate. Further, the capacitive frame rate may be any fraction or multiple of the display frame rate. In one or more embodiments, the capacitive frame rate may be a rational fraction of the display frame rate (e.g., ½, ⅔, 1, 3/2, or 2, among others). The display frame rate may change while the capacitive frame rate remains constant. The display frame rate may remain constant while the capacitive frame rate is increased or decreased. Alternately, the capacitive frame rate may be unsynchronized from the display frame rate or the capacitive frame rate may be a non-rational fraction of the display frame rate to minimize interference "beat frequencies" between the display updating and the input sensing.

Input sensing and updating of the display panel 210 (e.g., display updating) occur during at least partially overlapping periods. For example, the sensor electrodes 105 are operated for capacitive sensing while the gate lines 224 and data lines 222 are operated to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

Figure 3A:
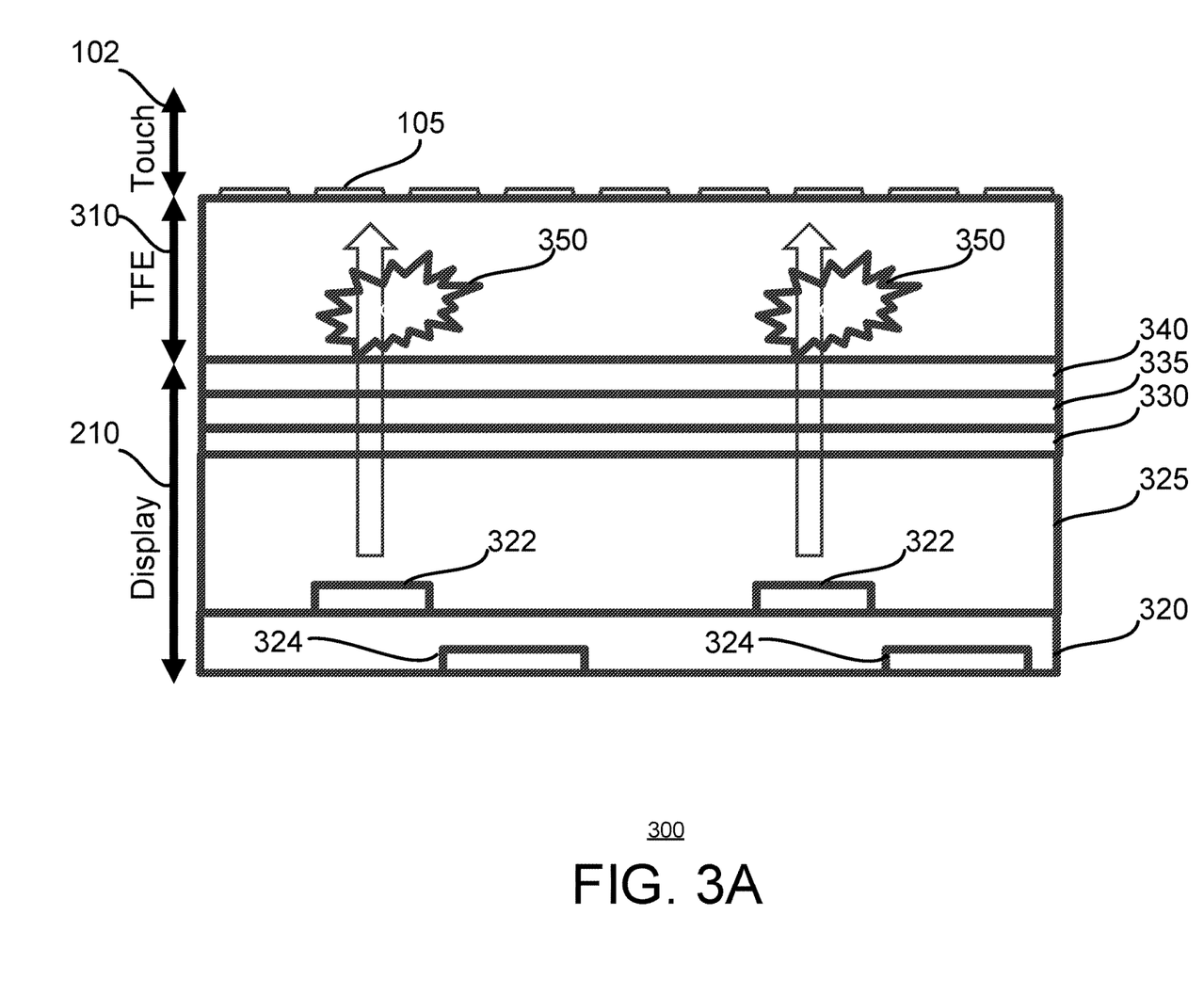
FIG. 3A illustrates a partial side view of the input device and the display device in accordance with certain embodiments.

FIG. 3A illustrates a partial side view 300 of the input device 100 and the display device 200, in accordance with certain embodiments. In the embodiment of FIG. 3A, the display panel 210 is an organic light emitting diode (OLED) display panel. However, in other embodiments, other display types (e.g., liquid crystal displays (LCDs) or the like) may be utilized.

As part of the display panel 210, FIG. 3A shows a plurality of gate contacts 324 in an interlayer dielectric (ILD) layer 320 and a plurality of source contacts 322 in a passivation layer 325, which form the subpixel electrodes 226 as shown in FIG. 2B. Each subpixel electrode 226 may be controlled by a unique pair of a gate contact 324 and a source contact 322. The gate contacts 324 may be electrically connected to the gate lines 224, and the source contacts 322 may be electrically connected to the data lines 222. The electrical connections may be formed by one or more patterned metal layers in the substrate underlying the ILD layer 320 and/or interposers disposed therebetween.

On top of the passivation layer 325, there may be an anode layer 330, an OLED layer 335, and a cathode layer 340. Once charged, the anode layer 330 and/or the cathode layer 340 may inject carries (e.g., holes and/or electrons) into the organic layer (e.g., the OLED layer 335), which are subsequently withdrawn from the other side. This process causes the organic layer to excite light.

The display panel 210 is arranged on one side of an encapsulation layer (such as the thin-film encapsulation (TFE) layer 310), while the touch sensor 102 is arranged on the other side of the encapsulation layer. In this example, the sensor electrodes 105 are disposed on the TFE layer 310.

The operation of one of the display device 200 and the input device 100 may affect the operation of the other one. For instance, refreshing of the display device 200 may cause charging/discharging of the display electrodes, which may induce charges in the sensor electrodes 105, thereby causing electromagnetic interference (EMI) therein. This EMI noise is a significant component of display-to-touch (D2T) noise (e.g., noise 350 as shown in FIG. 3A) and increases significantly as the encapsulation layer thickness decreases. For instance, a thinner encapsulation layer may cause the capacitance between the display and the touch sensors to increase dramatically, thereby increasing the coupling between the display and the touch sensors. As such, there is an increased risk of voltage errors due to display modulation coupling to the touch sensor (e.g., the touch electrodes 105), resulting in deteriorated touch panel performance caused by D2T noise.

Conventional rigid OLED touch screens typically incorporate an encapsulation layer approximately 200 micrometers thick, while flexible or foldable OLED touch screens often employ significantly thinner encapsulation layers (e.g., approximately eight micrometers). Consequently, in flexible or foldable OLED touch screen devices, the issue of D2T noise becomes more pronounced, primarily because of the thin encapsulation layer situated between the display and touch sensor electrodes.

Figure 3B:
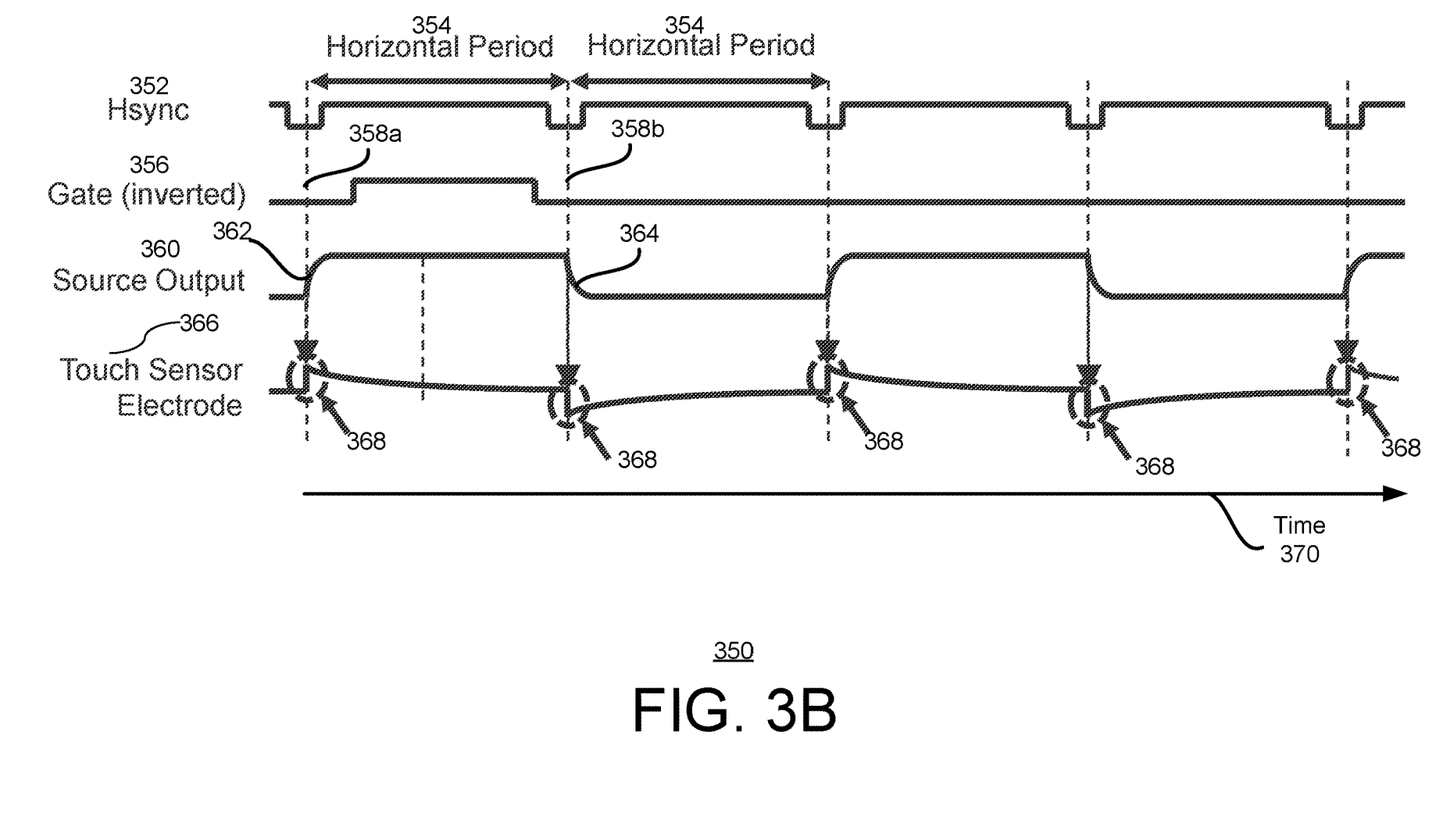
FIG. 3B is an exemplary waveform diagram during operation of a touch screen device in accordance with certain embodiments.

FIG. 3B is an exemplary waveform diagram 350 during operation of a touch screen device. The touch screen device may include the input device 100 and the display device 200 arranged as shown in FIG. 3A. The waveform diagram 350 indicates signals associated with a particular gate line 224 and a particular data line 222 corresponding to a particular display electrode 226 along a time scale (as indicated by arrow 370). This example illustrates D2T noise based on the horizontal synchronization of the display panel 210 for illustrative purposes only. It will be appreciated that alternative display update methods, such as vertical synchronization, can also be employed.

In this example, horizontal synchronization (Hsync) waveform 352 indicates synchronization signals that include pulses to separate individual scan lines. For example, negative pulses at time 358a and 358b separate different horizontal periods 354 to cause update of different horizontal lines in the display panel 210. The inverted gate waveform 356 indicates gate signals that are sent to the particular gate line 224 to select/deselect the particular gate line 224 to select (activate) and deselect (deactivate) corresponding subpixels for updating. Source output curve 362 indicates signals (e.g., output voltages) to data lines 222 caused by the display driver 208. The combination of the synchronization signal, the gate signal, and the data signals may cause a set of subpixels (e.g., a horizontal line) to be updated during a particular time period. For example, at time 358a, a particular data line 222 charges at time 358a and discharges at 358b, as indicated by curves 362 and 364, respectively. Curve 366 shows noise induced in one or more touch sensor electrodes 105 by the signals output to the data lines 222 from the display driver 208. For instance, the touch sensor electrode curve 366 at regions 368 shows significant signal changes that diminish over time, which may simulate the effect of input sensing of an input object 106, resulting in poor user experience.

As discussed above, the control signals (e.g., data signals through data lines 222) sent to the respective display electrodes 226 cause the generation of periodic noise in the sensor electrodes 105. Depending on the signals sent to the respective data lines 222, the intensity of the noise induced in the corresponding sensor electrodes 105 may change accordingly. D2T noise is difficult to suppress due to simultaneous touch and display operations.

The present disclosure provides a noise compensation system to address D2T noise by utilizing display data from a display control function (e.g., the display driver 208) to generate predicted noise compensation data for subsequent input sensing.

Figure 4:
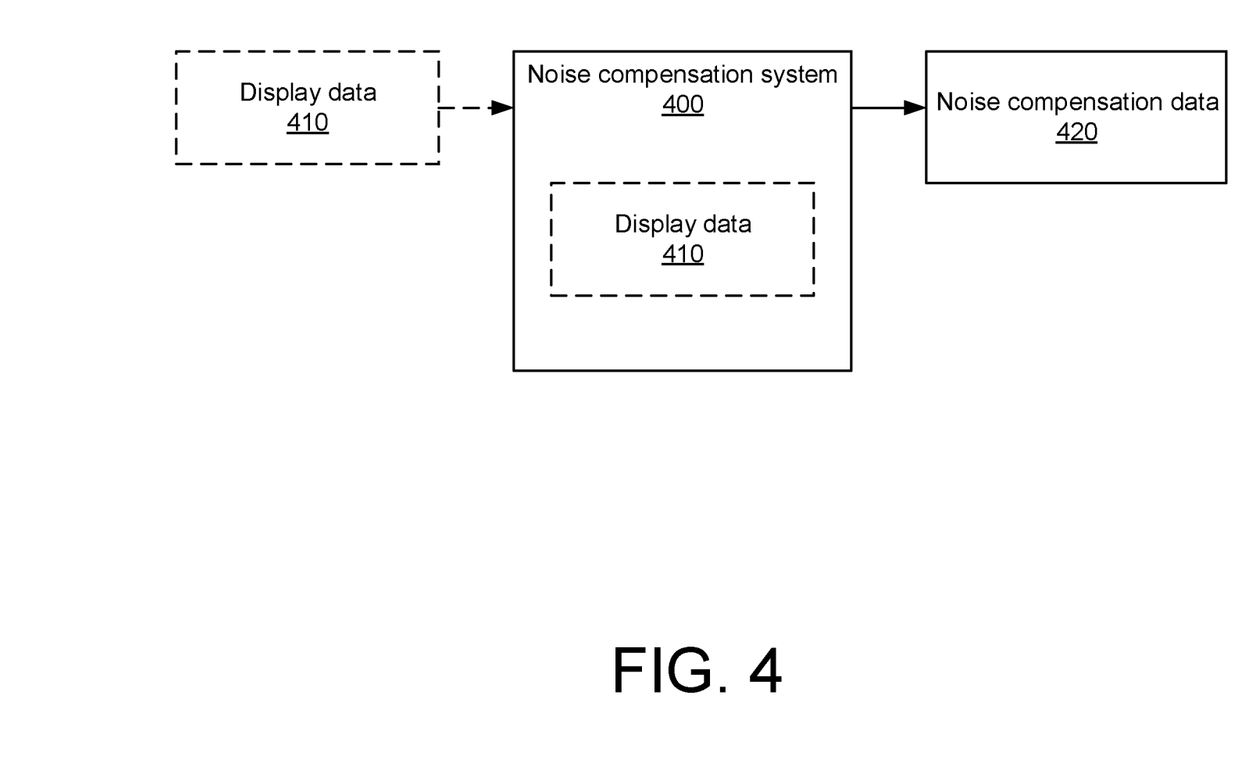
FIG. 4 a block diagram of an exemplary data process performed by a noise compensation system in accordance with certain embodiments.

FIG. 4 is a block diagram of an exemplary data process performed by a noise compensation system 400 in accordance with certain embodiments.

Display data 410 includes any suitable data used to update some or all of the subpixels in the display panel 210. For example, the display data 410 may include synchronization signals, gate signals, data signals, and other suitable control signals (e.g., multiplexer (MUX) timing signals for switching) at predefined times and/or time periods. In some examples, the display data 410 may include information and/or instructions for generating control signals at predefined times or time periods. As such, the noise compensation system 400 may generate noise compensation data 420 based on the display data 410, while the display control function (e.g., the display driver 208) generates control signals to update the display panel 210 based on the same display data 410. Furthermore, the display data 410 may include relevant time information to indicate predefined times or time periods for particular control signals corresponding to display updates and/or positional information to indicate the particular subpixels to be updated.

In an embodiment, the noise compensation system 400 may include the processing system 211 as shown in FIG. 2B that incorporates the processing system 110 and the display driver 208. For example, the processing system 110 and the display 208 may be integrated on a single IC chip/module. In another embodiment, the noise compensation system 400 may include one of the processing system 110 or the display driver 208. In yet another embodiment, the noise compensation system 400 may be a separate component (e.g., including a separate processing system/control device) that is communicatively connected to the processing system 110 and the display driver 208. It will be appreciated that the noise compensation system 400 may include any suitable software and/or hardware components to facilitate functions described in the present disclosure.

The noise compensation system 400 is configured to obtain the display data 410 from a display control function in the display device 200. For example, the noise compensation system 400 may include the display control function (e.g., the display driver 208) or be configured to communicate with the display control function (e.g., the display driver 208) through a communication channel.

The noise compensation system 400 is configured to generate the noise compensation data 420 based on the display data 410. As such, the noise compensation system 400 may utilize "prior" display information from the display device 200 to estimate noise compensation for subsequent input sensing by the sensor device 100.

Figure 5:
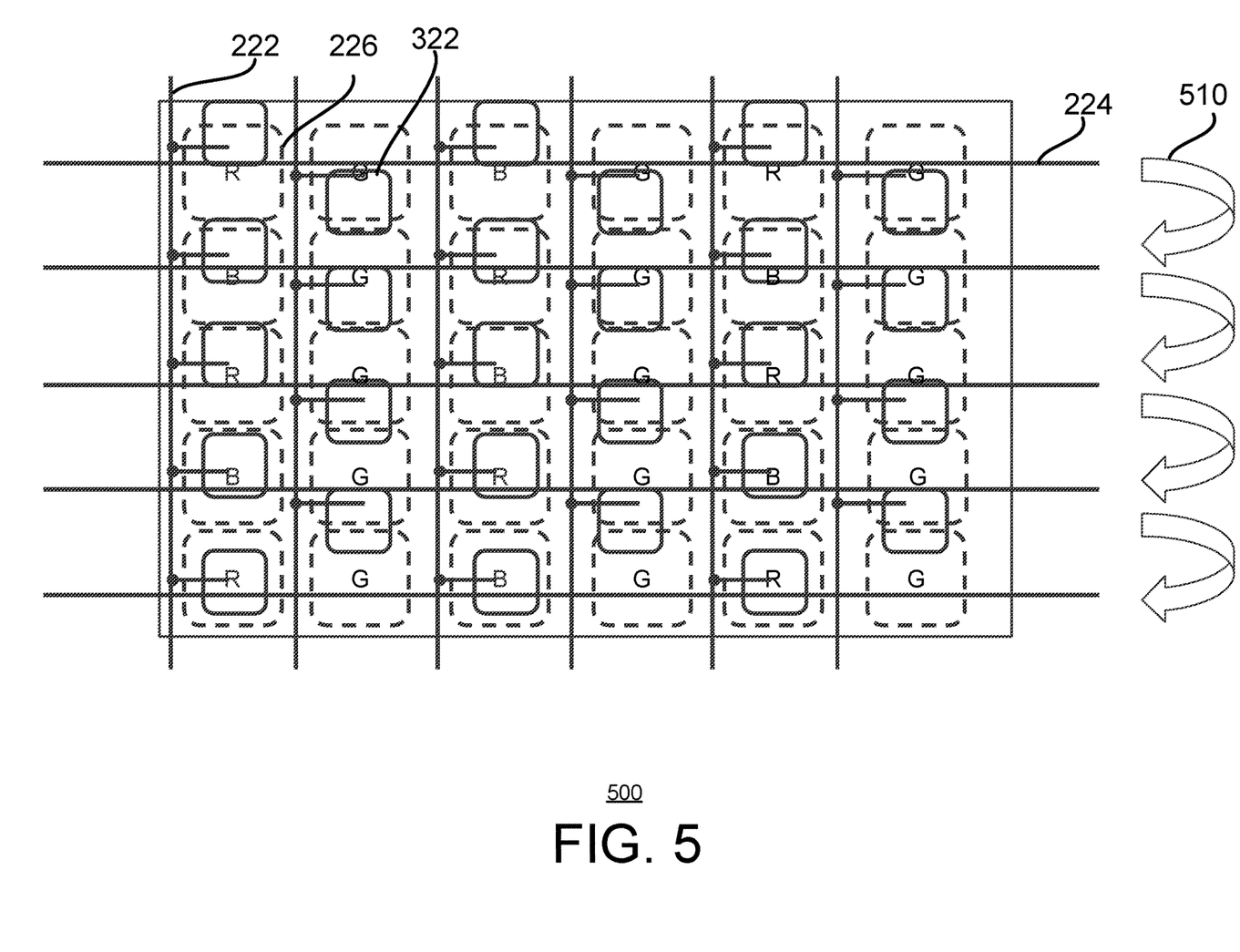
FIG. 5 is a block diagram of an exemplary subpixel array in accordance with certain embodiments.

FIG. 5 is a block diagram of an exemplary subpixel array 500 in accordance with certain embodiments. It will be appreciated that the exemplary subpixel array depicted in FIG. 5 is merely an example, and that the principles discussed herein may also be applicable to other situations—for example, including other types of display and/or sensor devices, integrated or separate control systems for the display and sensor devices, and horizontal, vertical, or other synchronization configurations.

In FIG. 5, the subpixel array 500 shows five gate lines 224 and six data lines 222, connected to a plurality of display electrodes 226. Each gate line 224 is connected to a row of display electrodes 226, and each data line 222 is connected to a column of display electrodes 226 through a corresponding source (e.g., a source contact 322 as shown in FIG. 3A). Each display electrode 226 is configured to control one of a red ("R"), a green ("G"), or a blue ("B") subpixel through a respective source and gate. Table 1 shows an exemplary naming convention for the subpixels in the subpixel array 500.

TABLE 1

Naming of the subpixels in the subpixel array 500 as shown in FIG. 5.

| Line n     | S1(n)     | S2(n)     | S3(n)     | S4(n)     | S5(n)     | S6(n)     |
|------------|-----------|-----------|-----------|-----------|-----------|-----------|
| Line n + 1 | S1(n + 1) | S2(n + 1) | S3(n + 1) | S4(n + 1) | S5(n + 1) | S6(n + 1) |
| Line n + 2 | S1(n + 2) | S2(n + 2) | S3(n + 2) | S4(n + 2) | S5(n + 2) | S6(n + 2) |
| Line n + 3 | S1(n + 3) | S2(n + 3) | S3(n + 3) | S4(n + 3) | S5(n + 3) | S6(n + 3) |
| Line n + 4 | S1(n + 4) | S2(n + 4) | S3(n + 4) | S4(n + 4) | S5(n + 4) | S6(n + 4) |
|            | Source 1  | Source 2  | Source 3  | Source 4  | Source 5  | Source 6  |

As shown in Table 1, the (vertical) data (or source) lines 222 from left to right may be named Source 1 to Source 6. The (horizontal) gate lines 224 from top to bottom may be named Line n to Line n+4. In this way, each subpixel in the array 500 may be named according to Table 1.

The noise compensation system 400 may determine a source output change on each source line 222. For example, the source output change may be calculated based on a previous voltage and the subsequent voltage on each source line 222. When the display panel 210 undergoes horizontal updates, the source lines 222 may receive output voltages from the display driver 208 sequentially. As shown in FIG. 3A, a cathode layer 340 is present over the source lines 222, coving the entire active display area. The touch sensor electrodes 105 are located above the cathode layer 340 at the OLED display stack-up. The presence of the cathode layer 340 results in the electrical averaging of coupling voltage, caused by simultaneous charging/discharging of the source lines 222. Consequently, the noise level reaching the touch sensor electrodes 105 may be proportional to the averaged voltage. Hence, the noise compensation system 400 may predict alterations in the source outputs by considering adjacent horizontal updates, such as the source outputs in neighboring rows.

In this example, the subpixel array 500 is updated horizontally. That said, the noise compensation system 400 may determine the source output changes for the source lines 222 based on source outputs of adjacent source lines 222 (e.g., as indicated by arrows 510). Table 2 shows source output changes calculated for the subpixels in the array 500.

(e.g., the horizontal periods 354 as shown in FIG. 3B). As such, the noise compensation system 400 may determine noise compensation data 420 corresponding to one set of horizontal subpixels for a respective horizontal update period. For example, in Table 2, the calculations for each row may correspond to a specific horizontal update period. Therefore, the rows depicted illustrate computations for a sequence of horizontal update periods.

Considering that the calculated averaged voltages, resulting from the charging/discharging of the data lines 222, vary during each horizontal period 354 (e.g., horizontal rows) based on the display image, noise compensation may be computed for every horizontal period 354.

The noise compensation system 400 may generate the noise compensation data 420 before, during, or after a display update associated with the display data 410. The noise compensation system 400 may provide the noise compensation data 420 to a sensing input function (e.g., the touch controller 204) that may be part of or communicatively connected to the noise compensation system 400. In an embodiment, the noise compensation system 400 may obtain suitable coefficients from the sensor device 100 (e.g., the processing system 110) to adjust (e.g., scale) the noise compensation data 420. For example, the coefficients may include or be based on parameters (such as TFE thickness, refractive index, etc.) obtained through design/calibration/tuning of the display and/or the sensor device and/or configurable parameters based on user input. In another embodiment, the noise compensation system 400 may provide the noise compensation data 420 to the touch controller 204.

TABLE 2

Source output changes of the subpixels in the subpixel array 500 as shown in FIG. 5.

| Line n     | S1(n)-     | S2(n)-     | S3(n) -    | S4(n) -    | S5(n) -    | S6(n) -    |
|------------|------------|------------|------------|------------|------------|------------|
|            | S1'(n + 4) | S2'(n + 4) | S3'(n + 4) | S4'(n + 4) | S5'(n + 4) | S6'(n + 4) |
| Line n + 1 | S1(n + 1)- | S2(n + 1)- | S3(n + 1)- | S4(n + 1)- | S5(n + 1)- | S6(n + 1)- |
|            | S1(n)      | S2(n)      | S3(n)      | S4(n)      | S5(n)      | S6(n)      |
| Line n + 2 | S1(n + 2)- | S2(n + 2)- | S3(n + 2)- | S4(n + 2)- | S5(n + 2)- | S6(n + 2)- |
|            | S1(n + 1)  | S2(n + 1)  | S3(n + 1)  | S4(n + 1)  | S5(n + 1)  | S6(n + 1)  |
| Line n + 3 | S1(n + 3)- | S2(n + 3)- | S3(n + 3)- | S4(n + 3)- | S5(n + 3)- | S6(n + 3)- |
|            | S1(n + 2)  | S2(n + 2)  | S3(n + 2)  | S4(n + 2)  | S5(n + 2)  | S6(n + 2)  |
| Line n + 4 | S1(n + 4)- | S2(n + 4)- | S3(n + 4)- | S4(n + 4)- | S5(n + 4)- | S6(n + 4)- |
|            | S1(n + 3)  | S2(n + 3)  | S3(n + 3)  | S4(n + 3)  | S5(n + 3)  | S6(n + 3)  |
|            | Source 1   | Source 2   | Source 3   | Source 4   | Source 5   | Source 6   |

In the example of Table 2, values from the last line (e.g., S1' (n+4)) in the previous frame may be subtracted from values of the first line (e.g., S1(n)). In the case of the first line of a first frame (such that there may not be values for the last line of the previous frame), the values of S1' (n+4) through S6' (n+4) may refer to default values (e.g., the values may be set to zero). In some variations, the values of S1' (n+4) through S6' (n+4) may correspond to voltages in a blanking period between the previous frame and the current frame.

The noise compensation system 400 may summate all columns in each gate line 224 at every horizontal period The touch controller 204 may then apply coefficients to further adjust (e.g., scale) the noise compensation data 420. In a further embodiment, the touch controller 204 may apply the noise compensation data 420 or the adjusted data to an ADC or the output of the ADC, within the sensor device 100 during a corresponding update period (e.g., horizontal), serving as an estimated compensation for noise caused by the display device 200 during the particular update period.

Figure 6:
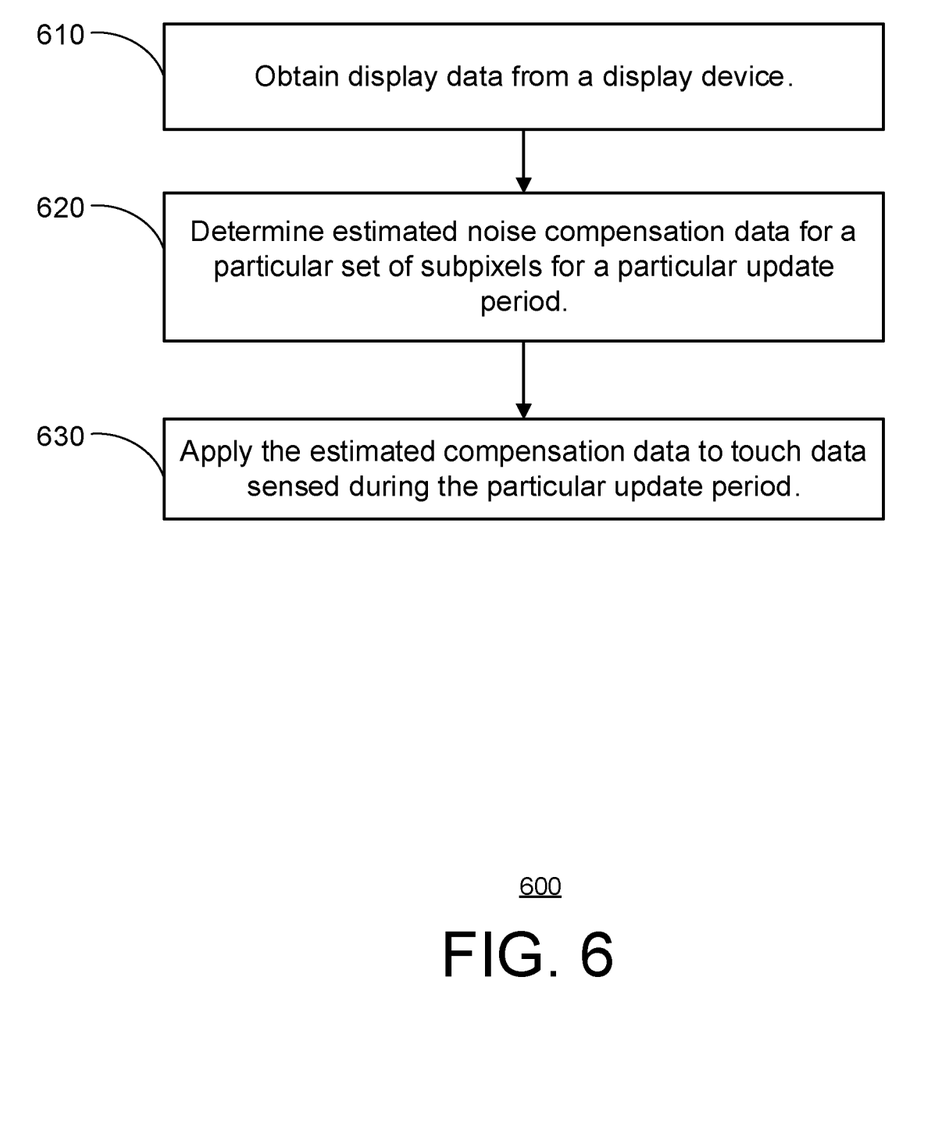
FIG. 6 a flowchart of an exemplary process for noise compensation in accordance with certain embodiments in accordance with certain embodiments.

FIG. 6 is a flowchart of an exemplary process 600 for noise compensation in accordance with certain embodiments. For example, the process 600 may be performed by the noise compensation system 400 to process display data 410 provided by a display control function in the display device 200 to generate noise compensation data 420.

At 610, the noise compensation system 400 obtains display data 410 from the display device 200. The display data 410 may include information/instructions to periodically update subpixels in the display panel 210 of the display device 200. For example, the display panel 210 may be updated based on horizontal scans. Each horizontal scan may update one or more horizontal rows of subpixels in the display panel 210.

At 620, the noise compensation system 400 determines estimated noise compensation data 420 for a particular set of subpixels for a particular update period. For example, based on the display data 410, the noise compensation system 400 may determine the update to a particular set of subpixels associated with a horizontal scan during a particular update period. The noise compensation system 400 may apply coefficients from the sensor device 100 to adjust the noise compensation data 420.

At 630, the noise compensation system 400 applies the estimated noise compensation data 420 to touch data sensed during the particular update period. The noise compensation system 400 may apply the estimated noise compensation data 420 to a sensing input function (e.g., the touch controller 204) during the particular update period. Alternatively, the noise compensation system 400 may provide the estimated noise compensation data 420 with the corresponding update period to a sensing input function (e.g., the touch controller 204). The sensing input function may then apply the estimated noise compensation data 420 during the particular update period to mitigate an effect of display-to-touch noise on the touch data. The noise-mitigated touch data may then be used, for example, for relatively more accurate and reliable determination of presence, location, force and/or motion of one or more input objects with respect to a touch sensing region of the input device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for noise compensation, comprising:
an input device comprising a plurality of sensor electrodes configured to obtain touch data;
a display device configured to provide display data for display on a display, wherein each row of subpixels of the display is associated with a respective gate line and each column of subpixels of the display is associated with a respective data line; and
a processing system configured to:
obtain the display data, the display data comprising first display data for updating a plurality of subpixels of the display during a first display update period;
determine, based on the first display data, estimated noise compensation data for the plurality of subpixels for the first display update period, wherein determining the estimated noise compensation data for the plurality of subpixels for the first display update period includes:
for each column of subpixels: determining a first output for a first respective subpixel of the plurality of subpixels corresponding to a time period before the first display update period; determining a second output for a second respective subpixel of the plurality of subpixels corresponding to the first display update period, wherein the first respective subpixel and the second respective subpixel are located in the same column and adjacent rows; and calculating, based on the first output and the second output, an output change for the first respective subpixel of the plurality of subpixels corresponding to the first display update period;
for each row of subpixels corresponding to the first display update period, summating output changes corresponding to all columns of subpixels corresponding to the first display update period; and
determining the estimated noise compensation data based on the summating; and
apply the estimated noise compensation data to touch data obtained during the first display update period to mitigate an effect of display-to-touch noise on the touch data obtained during the first display update period.

2. The system according to claim 1, wherein the display data further comprises second display data for updating a second plurality of subpixels during a second display update period; and wherein the processing system is further configured to:
determine, based on the second display data, second estimated noise compensation data for the second plurality of subpixels for the second display update period; and
apply the second estimated noise compensation data to touch data obtained during the second display update period to mitigate an effect of display-to-touch noise on the touch data obtained during the second display update period.

3. The system according to claim 1, wherein the display device comprises a display driver.

4. The system according to claim 3, wherein the display driver is part of the processing system.

5. The system according to claim 3, wherein the processing system is communicatively coupled to the display driver and is configured to obtain the display data from the display driver.

6. The system according to claim 3, wherein the display driver and a touch controller of the input device are implemented in a same chip.

7. The system according to claim 6, wherein the chip implementing the display driver and the touch controller is part of the processing system.

8. The system according to claim 1, wherein the first and second outputs correspond to voltages for the first and second respective subpixels output to a corresponding data line.

9. A method for noise compensation, comprising:
obtaining, by a processing system, display data comprising first display data for updating a plurality of subpixels of a display during a first display update period, wherein each row of subpixels of the display is associated with a respective gate line and each column of subpixels of the display is associated with a respective data line;
determining, by the processing system, based on the first display data, estimated noise compensation data for the plurality of subpixels for the first display update period, wherein determining the estimated noise compensation data for the plurality of subpixels for the first display update period includes:
for each column of subpixels: determining a first output for a first respective subpixel of the plurality of subpixels corresponding to a time period before the first display update period; determining a second output for a second respective subpixel of the plurality of subpixels corresponding to the first display update period, wherein the first respective subpixel and the second respective subpixel are located in the same column and adjacent rows; and calculating, based on the first output and the second output, an output change for the first respective subpixel of the plurality of subpixels corresponding to the first display update period; and
for each row of subpixels corresponding to the first display update period, summating output changes corresponding to all columns of subpixels corresponding to the first display update period; and
determining the estimated noise compensation data based on the summating; and
applying, by the processing system, the estimated noise compensation data to touch data obtained during the first display update period to mitigate an effect of display-to-touch noise on the touch data obtained during the first display update period.

10. The method according to claim 9, wherein the display data further comprises second display data for updating a second plurality of subpixels during a second display update period; and
wherein the method further comprises:
determining, based on the second display data, second estimated noise compensation data for the second plurality of subpixels for the second display update period; and
applying the second estimated noise compensation data to touch data obtained during the second display update period to mitigate an effect of display-to-touch noise on the touch data obtained during the second display update period.

11. The method according to claim 9, wherein the display data is provided by a display driver.

12. The method according to claim 11, wherein the display driver is part of the processing system.

13. The method according to claim 11, wherein the processing system is communicatively coupled to the display driver and is configured to obtain the display data from the display driver.

14. The method according to claim 11, wherein the display driver and a touch controller are implemented in a same chip.

15. The method according to claim 14, wherein the chip implementing the display driver and the touch controller is part of the processing system.

16. A non-transitory computer-readable medium, having computer-executable instructions stored thereon for noise compensation, wherein the computer-executable instructions, when executed, facilitate performance of the following:
obtaining display data comprising first display data for updating a plurality of subpixels of a display during a first display update period, wherein each row of subpixels of the display is associated with a respective gate line and each column of subpixels of the display is associated with a respective data line;
determining, based on the first display data, estimated noise compensation data for the plurality of subpixels for the first display update period, wherein determining the estimated noise compensation data for the plurality of subpixels for the first display update period includes:
for each column of subpixels: determining a first output for a first respective subpixel of the plurality of subpixels corresponding to a time period before the first display update period; determining a second output for a second respective subpixel of the plurality of subpixels corresponding to the first display update period, wherein the first respective subpixel and the second respective subpixel are located in the same column and adjacent rows; and calculating, based on the first output and the second output, an output change for the first respective subpixel of the plurality of subpixels corresponding to the first display update period; and
for each row of subpixels corresponding to the first display update period, summating output changes corresponding to all columns of subpixels corresponding to the first display update period; and
determining the estimated noise compensation data based on the summating; and
applying the estimated noise compensation data to touch data obtained during the first display update period to mitigate an effect of display-to-touch noise on the touch data obtained during the first display update period.

17. The non-transitory computer-readable medium according to claim 16, wherein the display data further comprises second display data for updating a second plurality of subpixels during a second display update period; and wherein the computer-executable instructions, when executed, further facilitate performance of the following:

determining, based on the second display data, second estimated noise compensation data for the second plurality of subpixels for the second display update period; and applying the second estimated noise compensation data to touch data obtained during the second display update period to mitigate an effect of display-to-touch noise on the touch data obtained during the second display update period.

\* \* \* \* \*